(12) United States Patent
Heyworth

(10) Patent No.: US 7,388,680 B2
(45) Date of Patent: Jun. 17, 2008

(54) GAP MONITOR ARRANGEMENT

(75) Inventor: Harold Heyworth, Loughborough (GB)

(73) Assignee: Rolls-Royce plc, London (GB)

( * ) Notice: Subject to any disclaimer, the term of this patent is extended or adjusted under 35 U.S.C. 154(b) by 145 days.

(21) Appl. No.: 11/446,267

(22) Filed: Jun. 5, 2006

(65) Prior Publication Data
US 2006/0291059 A1    Dec. 28, 2006

(30) Foreign Application Priority Data
Jun. 25, 2005    (GB) ................... 0513010.9

(51) Int. Cl.
*G01B 11/28*    (2006.01)
*G01B 11/14*    (2006.01)

(52) U.S. Cl. ..................... 356/630; 356/625

(58) Field of Classification Search ......... 356/625–640
See application file for complete search history.

(56) References Cited

U.S. PATENT DOCUMENTS

| | | | |
|---|---|---|---|
| 4,326,804 A * | 4/1982 | Mossey | 356/623 |
| 4,357,104 A * | 11/1982 | Davinson | 356/4.07 |
| 4,596,460 A * | 6/1986 | Davinson | 356/3.06 |
| 5,017,796 A * | 5/1991 | Makita | 250/559.38 |
| 5,349,850 A | 9/1994 | Young | |
| 5,440,395 A * | 8/1995 | Makita | 356/630 |
| 6,678,060 B2 * | 1/2004 | Heyworth | 356/614 |
| 2002/0093665 A1 * | 7/2002 | Heyworth | 356/614 |
| 2006/0002789 A1 * | 1/2006 | Haffner et al. | 415/118 |

FOREIGN PATENT DOCUMENTS

| | | |
|---|---|---|
| EP | 1 223 406 A1 | 7/2002 |
| WO | WO 97/26444 | 7/1997 |

* cited by examiner

*Primary Examiner*—L. G. Lauchman
*Assistant Examiner*—Jarreas C Underwood
(74) *Attorney, Agent, or Firm*—Oliff & Berridge, PLC

(57) ABSTRACT

Monitoring of clearance gaps between a rotating component and a surrounding cowling surface is difficult in view of the general packaging constraints. Furthermore, when such operation occurs at high temperature there may be distortion in view of natural expansion and contraction over thermal gradients of the monitoring arrangement. By provision of a diffractive optical element with light guided for reflection against an aperture end and a part of a rotating component, it is possible through shift in the reflective wavelength frequencies to monitor and determine clearance gaps between that aperture end and incident parts of the rotating component.

8 Claims, 5 Drawing Sheets

GAP MONITOR ARRANGEMENT

The present invention relates to gap monitor arrangements and more particularly to such arrangements utilised with respect to rotating components such as blade assemblies in a gas turbine engine.

It will be understood in a number of situations it is desirable to monitor the clearance gap between a rotating component and a sleeve or other housing within which that rotating component rotates. This clearance gap may vary over the operational life of the rotating component due to creep and other mechanical effects as well as through thermal expansion and contraction. With gas turbine engines an important factor with regard to engine efficiency is maintaining a clearance gap between the blades and the cowling structure to minimise tip edge losses.

It will be understood that a gas turbine engine presents a relatively harsh environment in which there is high temperature as well as a significant potential for contamination of a monitoring arrangement. The gap monitoring arrangement will include a device which provides a clearance measurement. As indicated in a gas turbine engine there may be an environment with high temperatures, that is to say in excess of 1300° C. and high pressures, that is to say in excess of 600 psi. Currently the best approach to determining clearance gap is via an electrical capacitance probe, but such probes have a limited life in view of their maximum short term temperature limit of approximately 1300° C.

In accordance with the present invention there is provided a gap monitor arrangement for a rotating component in a sleeve at elevated temperatures, the arrangement comprising a diffractive optical element arranged in a housing with a light conduit to project and receive the light from a housing end of the diffractive optical element, the diffractive optical element arranged to guide and project light in use towards a rotating component through an aperture end of the diffractive optical element in use whereby light is reflected from the ends of the diffractive optical element and the rotating component to provide an indication of a gap between the aperture end of the diffractive optical element and the rotating component in use, the arrangement characterised in that the housing presents the housing end of the diffractive optical element with a light emitter/receiver projecting light into the diffractive optical element at a displaced location for reduced exposure to high sustained temperatures.

Typically, the housing incorporates an enclosure with the diffractive optical element at one end and the light emitter/receiver at the other end.

Normally, the light emitter/receiver is an optical fibre.

Preferably, there is a lens between the light emitter/receiver and the diffractive optical element in order to guide projected light to and from the housing end.

Possibly, the diffractive optical element includes a reflective surface for guiding the projected and/or reflective light.

Generally, the aperture end is sealed in order to limit exposure to contamination.

Generally, differences in reflected wave length are utilised in order to determine clearance gap.

Embodiments of the present invention will now be described by way of example and with reference to the accompanying drawings in which.

As indicated above, clearance gap determination is important in a wide range of machinery including gas turbine engines. Unfortunately, such machinery may operate in hostile environments where there are high temperatures and potential for contamination. In such circumstances, improved capability with regard to working at high temperatures, over sharp temperature gradients and in environments where there may be contaminants will be beneficial. It will be understood where there are high temperatures and in particular high temperature gradients, variability in the thermal expansion of different materials can result in erroneous determinations. In such circumstances, again a reduction of the number of materials within the gap monitoring arrangement will be beneficial.

Figure 1:
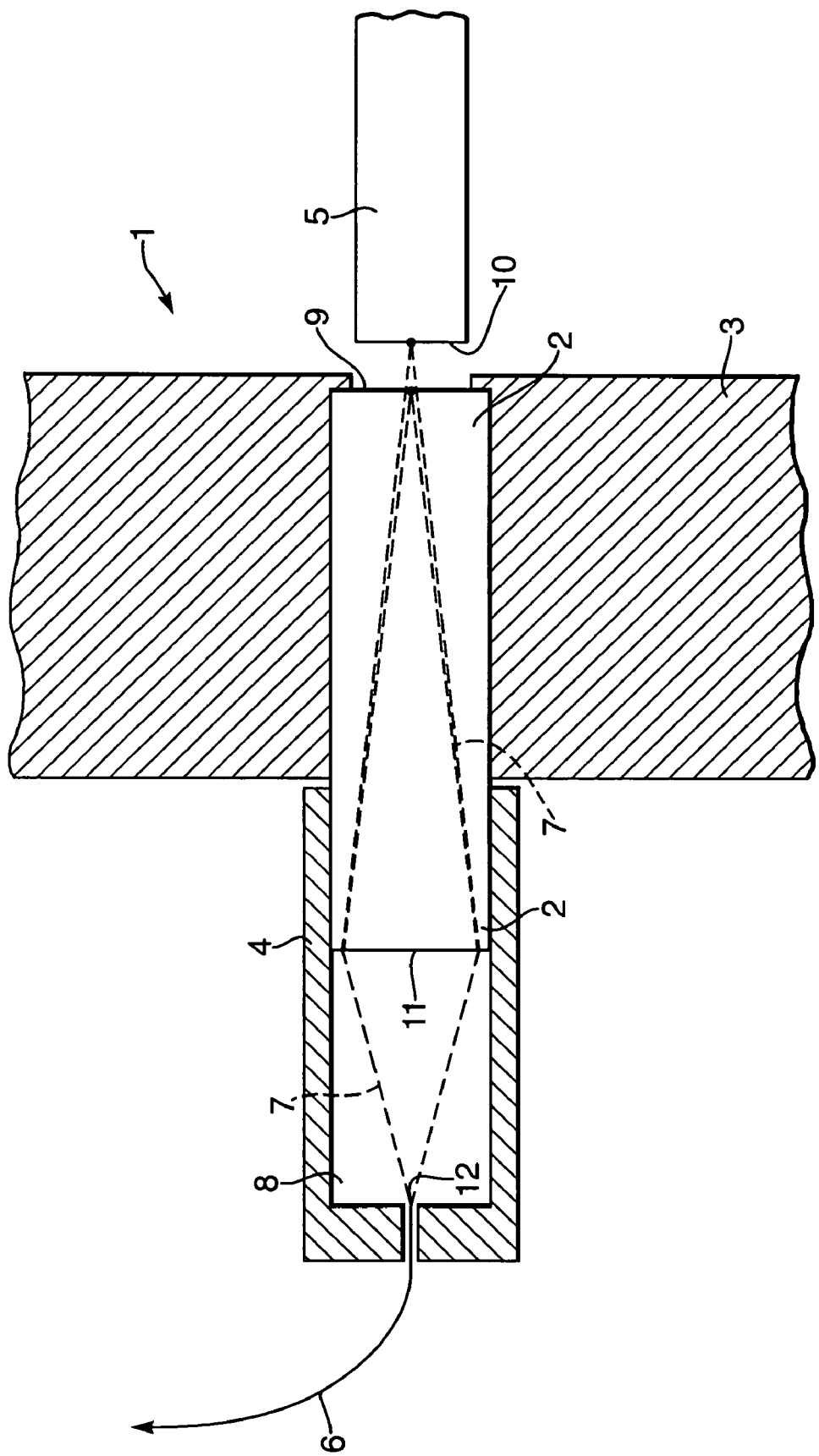
FIG. 1 is a schematic cross section of a first embodiment of a gap monitoring arrangement in accordance with the present invention.
Figure 2:
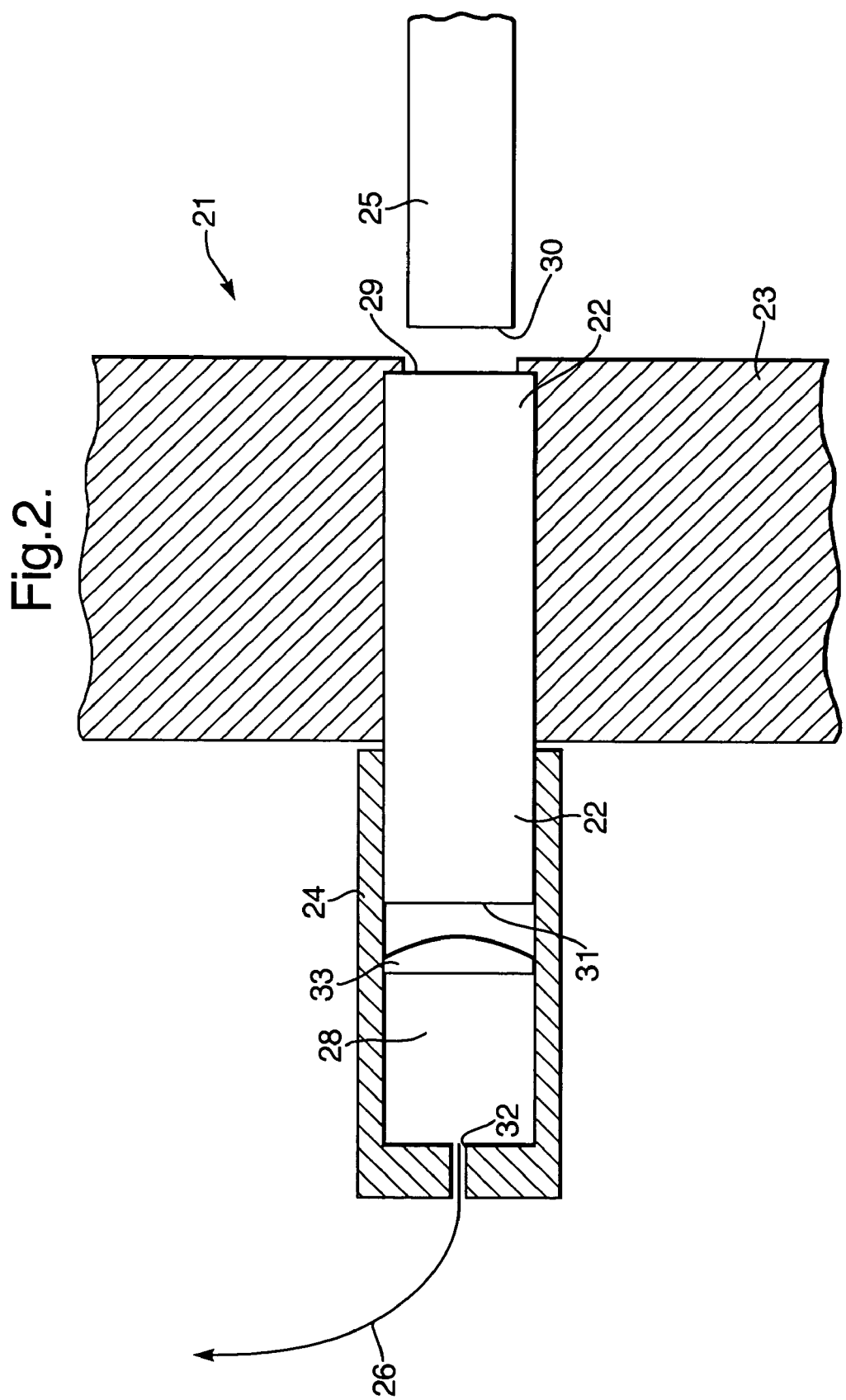
FIG. 2 is a schematic illustration of a second embodiment of a gap monitoring arrangement in accordance with the present invention.
Figure 3:
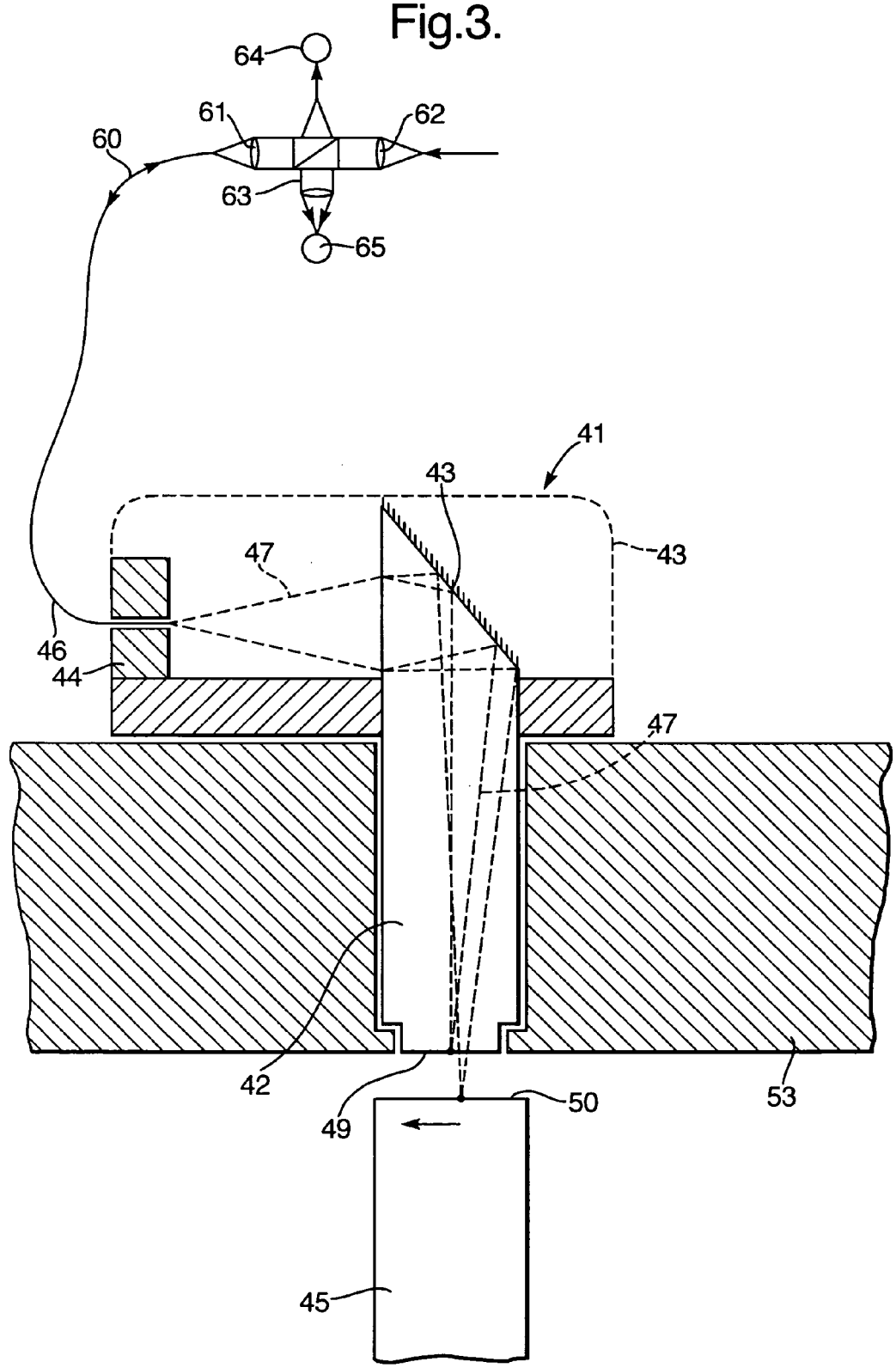
FIG. 3 is a schematic cross section of a third embodiment of a gap monitoring arrangement in accordance with the present invention.

FIGS. 1 to 3 illustrate respectively three differing embodiments of the present invention, but with the common feature of a diffractive optical element or zone plate. The diffractive optical element acts as a probe with light reflected at an aperture end of the diffractive optical element and also upon incidence with the rotating device. It will be appreciated that if the diffractive optical element effectively measures itself and then the distance to the rotating components such as a blade, then the difference between the two is the clearance gap. The aperture or front end of the diffractive optical element acts as a reference point or surface in order to enable the clearance gap as well as potential variations in rotating component length. It is important that the position of the aperture end is known relative to the sleeve or other surface which has a clearance gap with the rotating component so that differences can be monitored.

Referring to FIG. 1 provides a schematic cross section of a first basic embodiment of a clearance gap monitoring arrangement 1 in accordance with the present invention. Thus, the arrangement 1 includes a diffractive optical element (DOE) 2 secured in a wall 3 with a housing 4 at one end and a rotating component such as a blade 5 at the other. The housing 4 includes a light conduit 6 such as an optical fibre. This conduit 6 presents and receives light along optical paths 7 (shown in broken line) through a cavity 8 in the housing 4 and guided across the diffractive optical element 2 for reflection at an aperture end 9 and a tip 10 of the retaining component 5.

In such circumstances it will be appreciated that the reflectivity in terms of wave length difference between reflectivity at the aperture end 9 and the tip 10 provide an indication as to the clearance gap between that tip 10 and the aperture end 9.

In this basic embodiment it will be understood that the cavity 8 simply allows the beam from the conduit 6 to become incident upon a housing end 11 of the diffractive optical element 2. In such circumstances, care must be taken with regard to the distance between an end 12 of the conduit 6 such that the beam presented to the housing end 11 will be appropriately guided by the subsequent diffractive optical element 2 for incidence upon the end 9 and the tip 10.

By the present arrangement 1, resistance to contamination and maintained functionality at elevated temperatures and over significant temperature gradients is achieved. For example in the area of the rotating component 5 there may be a temperature in the order of 1300° C. whilst the temperature on the other side of the wall 3 may be 700° C. with a further temperature reduction at the conduit end 12 part of the housing 4 to in the order of 600° C. In such circumstances it will be understood that in this first basic embodiment depicted in FIG. 1, the arrangement simultaneously measures the clearance gap via a thermalised approach with a reference related to the aperture end 9 which avoids contamination of the optical components. It will also be understood that the aperture end 9 is the only exposed part and therefore limits the potential for contamination of the optical component parts of the arrangement.

Generally, the diffractive optical element will be formed from a single material such as sapphire such that variations in thermal expansion will not create distortions and errors with regard to clearance gap determination. With choice of an appropriate material arrangement in accordance with the present invention it will generally be possible to operate at temperatures up to 1600° C.

Generally arrangements in accordance with the present invention will be relatively small. This enables positioning of the arrangement within an engine such that the wall 3 comprises a cowling or sleeve around the rotating component 5 in the form of blades in a turbine.

It will be noted that the number of optical surfaces for the optical path to and from the end 9 and tip 12 is low such that the total loss of optical signal will be minimised. The housing or rear surface end 11 of the diffractive optical element can be combined with a focusing lens which will change the depth to which the arrangement in terms of projection of the light beam 7 can operate. This use of a lens is illustrated in the second embodiment depicted in FIG. 2.

As previously in FIG. 1, an arrangement 21 includes a diffractive optical element 22 secured within a wall 23 with a housing 24 at one end and a rotating component 25 such as a turbine blade assembly at the other. A light conduit 26 projects and receives light from the arrangement which is guided through an enclosure 28 and the diffractive optical element 22 such that light beams are incident upon the tip 30 of the rotary component 25 and there is internal self reflection at an aperture end 29 and upon reflective incidence upon the tip 30.

In such circumstances, as previously, light is reflected by the end 29 and tip 30 and the difference in terms of wave length utilised as described later in order to determine the clearance gap variation. It will be understood that a lens 33 is provided in order to alter the collination of the outgoing and returned light in order that the length of the arrangement can be adjusted as required. However, in other respects, operation is the same in terms of variations in the wave length reflected by the end 29 and tip 30 as that described with regard to FIG. 1.

FIG. 3 illustrates a third embodiment of a gap monitoring arrangement 41 in accordance with the present invention as a schematic front cross section. Thus, as previously, the arrangement 41 includes a diffractive optical element 42 with an enclosure 43 formed by a housing 44. A light conduit 46 projects and receives light along an optical path 47 into and out of the diffractive optical device 42. The arrangement is essentially folded with the diffractive optical device 42 projecting through a wall 53 to present the light along the optical path 47 upon an aperture surface 49 and incident upon a tip 50 of a rotating component 45.

The diffractive optical device 42 includes a reflective surface 43, i.e. a diffractive optical element to enable the effective length of the arrangement 41 to be reduced by the perpendicular fold created by the mirror surface 43. In either event as previously a gap between the tip 40 and the aperture end 49 is monitored by variation in the wave length as described later with regard to FIGS. 4 and 5.

It will be appreciated from above that at the core of the present invention is the use of a diffractive optical device comprising a diffractive optical element (DOE) in order to guide the light along the optical paths between the conduit and the rotating device/aperture end. It will be understood that modulated light may be emitted and received through the conduits in order that shifts in wave length can be determined as an indication as to changes in clearance gap between the rotating component and the end of the diffractive optical element.

As can be seen in FIG. 3, the device 42 or DOE emits and receives light in the direction of arrowheads 60. The light source may be a laser which projects light into the conduit 46 through lenses 61, 62 and a beam splitter 63. This light as indicated previously passes along the conduit 46 in the form of a diffractive optical fibre for projection into the cavity 45 and therefore guiding through a housing surface of the diffractive optical element and through the aperture end for incidence upon the end of the rotating component. Reflected light from the end 49 and tip 50 returns along the optical path 47, the conduit 46 and is split by the beam splitter 63 for incidence upon photodiodes 64, 65. These photodiodes 74, 75 provide a responsive electrical signal to a controller in order to determine photo diode output against wavelength.

Figure 4A:
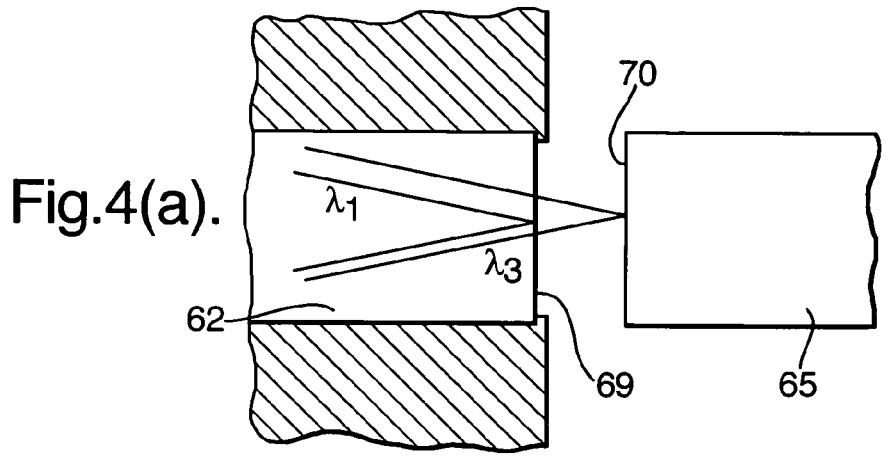
FIG. 4 is a graphic representation indicating the manner by which clearance gap variation is determined in accordance with the present invention; and, FIG. 5 provides graphic indications as to the wave length response utilised in accordance with the present invention in order to determine gap width variation.
Figure 4B:
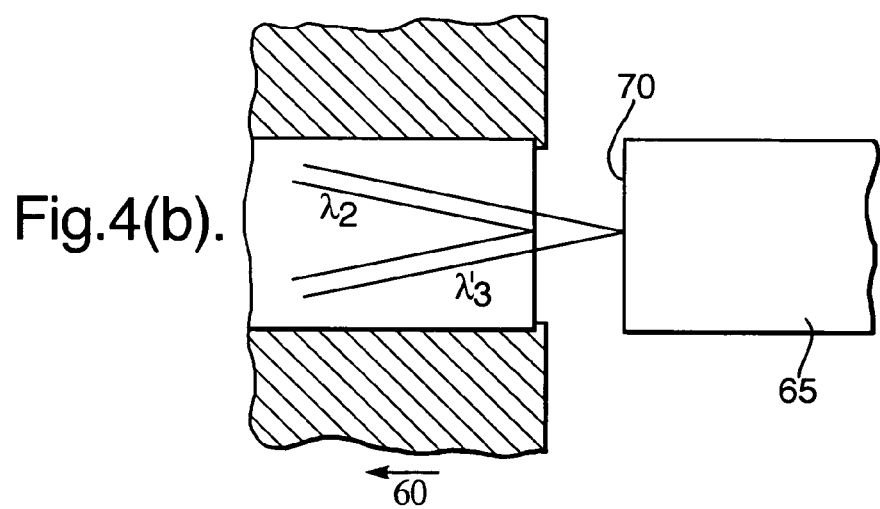
Figure 4C:
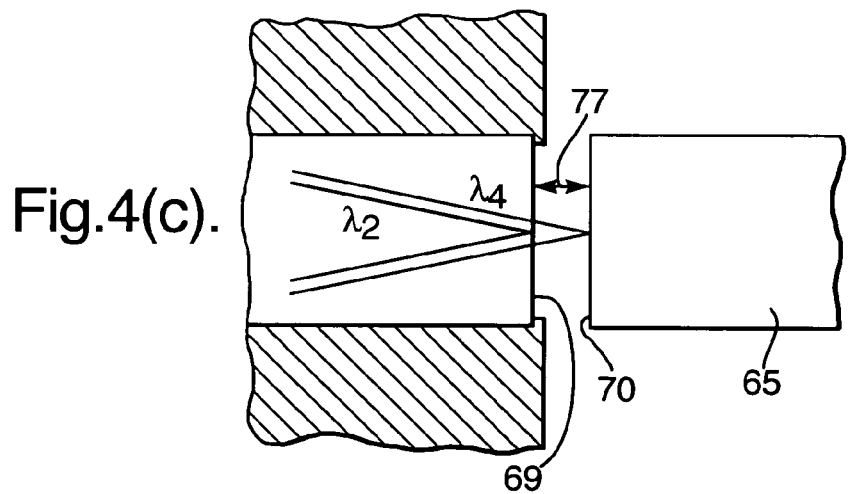

Referring to FIG. 4 illustrating respectively in FIG. 4a, a clearance gap reflective regime for a cold situation, in FIG. 4b a clearance gap reflective situation due to thermal expansion only and in FIG. 4c a reflective gap situation for both diffractive optical device and rotating component movement along with any thermal expansion.

In FIG. 4a, as can be seen, a diffractive optical element 62 has light which passes through the element 62 such that at different wave lengths, $\lambda_1$, $\lambda_3$ there is reflection from an aperture end 69 and a tip 70 respectively. In short, there is a particular wave length $\lambda$ which through the optical pathway defined by the diffractive optical element 62 as well as the conduit and any enclosure in the housing (not shown) which is harmonic and therefore will create an output peak in a photo diode as described later with regard to FIG. 5. FIG. 4a depicts a situation where the rotating component 65 and other parts of assembly are cold.

In FIG. 4b, clearance variation in terms of expansion is illustrated typical during a situation when there is an elevated temperature in a gas turbine engine. In such circumstances there is expansion in the direction of arrowhead 60, and in such circumstances the wavelengths $\lambda_2$, $\lambda_3$ are those upon which there is wave length harmonics and therefore peaks in the photo diode output (FIG. 5). Such expansion and contraction is to be expected with regard to thermal cycling in an engine during normal operation. The present gap monitoring arrangement can monitor and self correct for such expansion in use providing additional benefits over prior arrangements.

FIG. 4c concerns the principal operational requirement with respect to a gap monitoring arrangement in accordance with the present invention. Essentially it is important to monitor the rotating component 65 in order to become aware of movements of that rotating component 65. As described previously, when cold the reflective wave length of the aperture end 69 will be $\lambda_1$, but more normally at operational temperature, the reflective wave length will be $\lambda_2$ as determined by output from a photo diode. In any event, as the engine incorporating the rotating component 65 cycles from cold to a hot condition, there will be a transient from the cold reflective wave length $\lambda_1$, to the hot reflective wave length $\lambda_2$ due to variations in the arrangement expansion regime under the temperature gradient. In FIG. 4c, as indicated, monitoring of, in use, an operational clearance gap 77 is depicted. Thus the clearance gap 77 between the hot diffractive optical element (DOE) 62 and the tip 70 will be a function of $\lambda_2$-$\lambda_4$.

Figure 5A:
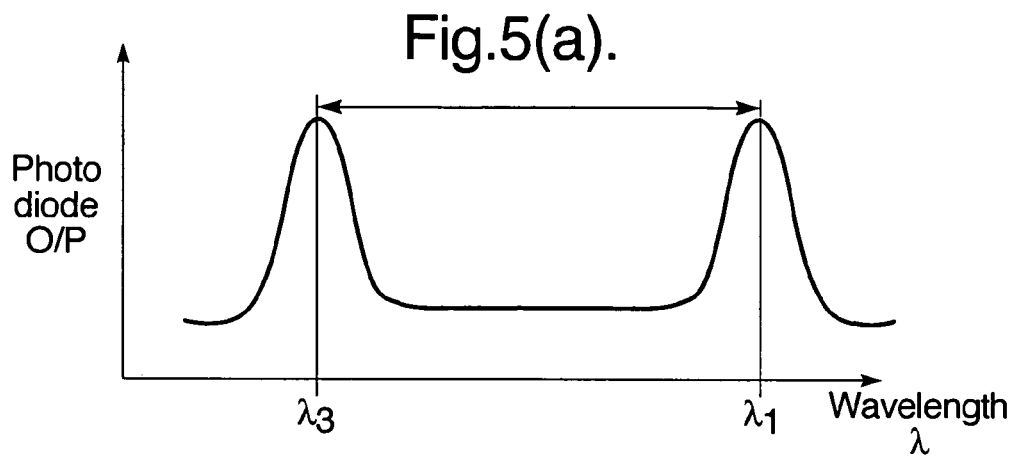
Figure 5B:
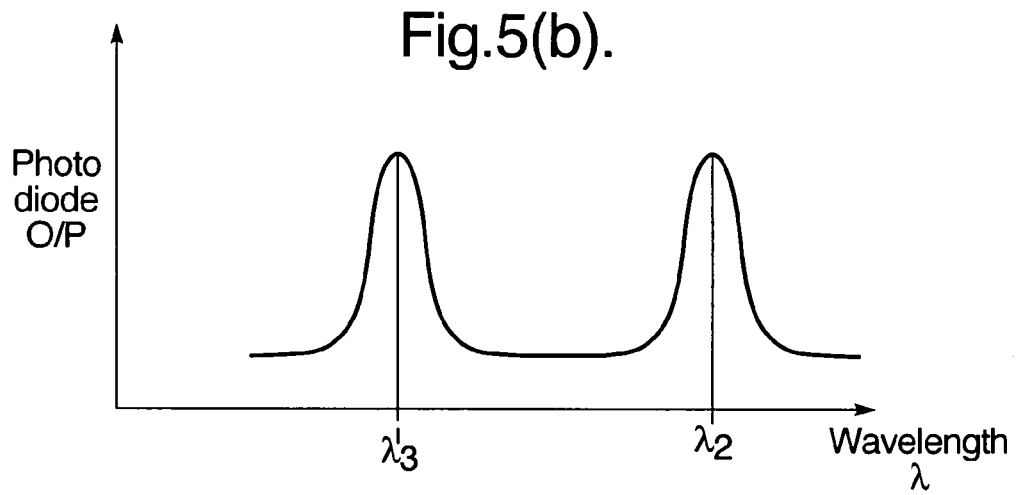
Figure 5C:
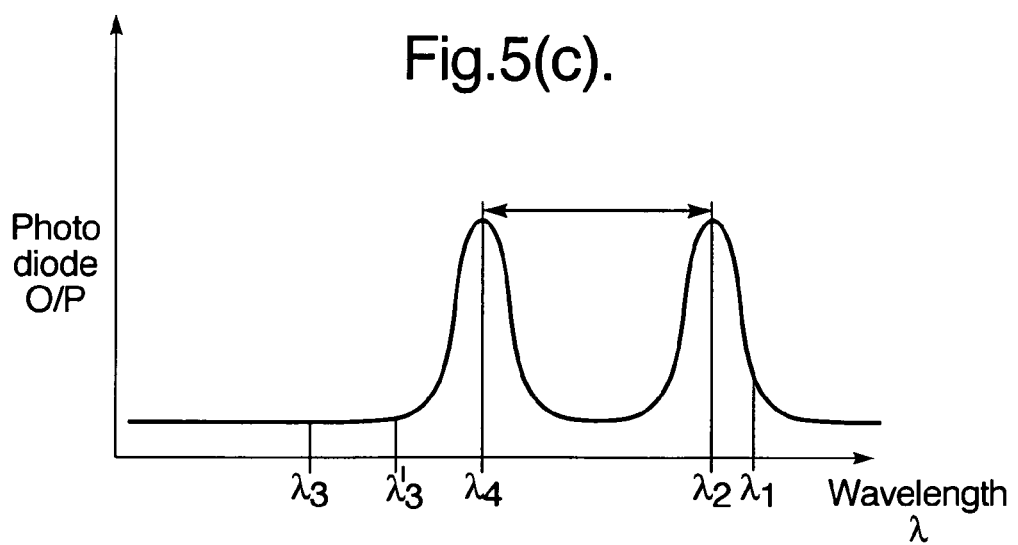

FIG. 5 provides graphical indications as to the photodiode output at different frequencies consistent with FIG. 4. Thus, FIG. 5a relates to the photo diode output against frequency for the cold situation depicted in FIG. 4a, FIG. 5b providing a graphic illustration of the photo diode output against frequency for the thermal expansive situation depicted in FIG. 4b and FIG. 5c illustrates photo diode output in relation to blade movement gap clearance to an aperture end of the diffractive optical element illustrated in FIG. 4c.

As can be seen in FIG. 5a, a photo diode (74, 75) in FIG. 3 provides output peaks at wave lengths $\lambda_3$ and $\lambda_4$. As indicated these are the harmonics with respect to reflectivity from the tip 70 of a rotating component 65 and the aperture end of the diffractive optical element 62. This provides a wave length difference 80 indicative of the gap between the end 69 and the tip 70.

As indicated above, naturally as a result of thermal expansion the gap between the tip 70 and the end 69 will close. Thus, as depicted in FIG. 5b the photo diode output shifts such that the respective harmonic wavelength of reflection from the rotating component tip 70 is now $\lambda_3$, whilst from the three aperture end the reflective wave length is $\lambda_2$. This can be considered the natural reference at operational temperature for the gap monitoring arrangement.

In FIG. 5c, clearance gap variation is illustrated with regard to the difference between wave length $\lambda_4$ and wave length $\lambda_2$ respectively, the respective wavelengths at the aperture end and up on the rotating tip or component 70. Thus, as can be seen for illustrative purposes, there is a shift in the cold reflective wave length $\lambda_3$ to the hot reflective wave length $\lambda_3$ to the actual reflective reflected wavelength $\lambda_4$ from the tip 70 dependent upon movement of the tip 70 upon the rotating component 65. The reference position for the aperture end 69 is given by the actual in use reflective wave length $\lambda_2$ rather than an initial cold calibrating wave length as may be the case with previous systems. In such circumstances the present invention is athermal in that there is an auto adjustment for such thermal gradients and therefore closer control of the clearance gap 77. This clearance is indicated as described previously by the difference in wave length 87 between $\lambda_4$ and $\lambda_2$. In such circumstances a controller can monitor this difference in wave length 87 as indicative of variation in clearance gap for ongoing adjustment or for testing/calibration purposes for the rotating component 67 in the machine or engine.

The present clearance gap monitoring arrangement has particular advantages. It will be understood that differential measurement allows for thermal expansion in the reflective wave lengths. As indicated this is auto-corrective and therefore more accurately reflects variations in clearance gap.

As only the aperture end is exposed it will be understood that the arrangement is substantially contaminant tolerant. Furthermore, there is relatively low maintenance in that the diffractive element can be easily removed and the one exposed surface, that is to say the aperture end can be easily cleaned.

No special cooling regimes are required as materials will be specified which can cope with the temperatures without additional cooling. Similarly, no coatings will be required upon the components provided appropriate choice of optical material is used. Lack of cooling and coatings will reduce costs and lower maintenance.

Generally, the diffractive optical element will be formed from material such as sapphire which will be robust in terms of temperature capability and chemical attack.

As indicated above, only the aperture end is exposed therefore there is minimal or zero cleaning or wash fluid required to keep that optical surface clear.

The present gap monitoring arrangement allows a high temperature gradient and range such that the rotating component may be at a temperature in the order of 2000° C., whilst at the rear of the arrangement, that is to say where the light conduit contacts the housing, the temperature may be below 750° C.

The rear of the arrangement will generally be at a uniform temperature and so distortive effects as a result of variable expansion upon the optical surfaces there will be minimised.

The aperture end may be modified in order to accommodate for partial reflection or split or through use of a dummy target.

As indicated above, generally the rotating component will take the form of blades secured upon a rotating shaft. In such circumstances, the reflective output will be modulated by the moving tip surface.

Generally the light source will be a titanium laser or semi-conductor laser or LED of super luminant swept/variable frequency over an appropriate wave length range to find the reflective wave lengths for peak outputs in the photo diode as described above.

Generally, the gap monitoring arrangement will be relatively small. Typically, the diffractive optical element will have a diameter of 3 to 30 mm and a length of 20 to 50 mm.

Typically, the arrangement will be made from a single piece diffractive optical element, and as will be understood there are no moving parts in the arrangement and therefore maintenance will be reduced. Furthermore, through the double pass approach of the same conduit, etc, both presenting and receiving reflected light, ensures that there is efficient use of components. Optical surface interface numbers are minimised in order to reduce optical losses at these interfaces. Furthermore, the double pass approach means that the probe is more compact.

Generally, the gap monitoring arrangement will be specified such that there is up to a 5 mm clearance gap range from the end of the diffractive optical element and normally through appropriate frequency sweeping by the light source a resolution in the order of 0.05 mm will be achieved. However, such ranging can be adjusted through use of lenses or by creating curvature upon the housing surface and/or focal length of the zone plate effect of the diffractive optical element.

Of particular practical use is removal of the analysing optical parts of the arrangement from high temperature areas to more ambient temperature areas or areas of uniform temperature to avoid distortive effects.

The present invention as indicated is self-compensating in terms of transient expansions by virtue of moveable wavelengths and a thermal adjustment therefore made.

As indicated, the present gap monitoring arrangement may determine rotating component expansion alone and/or clearance whether cold or operationally hot and/or movements in the probe itself as a result of thermal expansion.

It will be understood in order to achieve appropriate consistency and calibration, filtering/monochromatic/spectral analyser devices will be used to limit Planck emission onto the photo diodes and to tune the laser wavelength to reduce noise.

Modifications and alterations to the present invention will be appreciated by those skilled in the art. Thus, rather than providing an enclosure as described above, it may be possible to create a situation where the conduit launches and receives light through a direct coupling to the diffractive optical element through an appropriate optical fibre connection. Additionally, there may be modification of the aperture end with a coating for greater reflection and control of the light split. Additionally, as indicated above, a dummy target in the reflected light may be used as a reference.

As indicated above, generally the present invention will be utilised with regard to gas turbine engines and blade assemblies of such engines. However, there are other situations where there are high temperature environments with a potential for contamination. For example, oil thickness measurement and measurement of thickness of oil and shafts may be achieved at elevated temperatures by reflectivity upon the surfaces of that oil.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A gap monitor arrangement for a rotating component in a sleeve at elevated temperatures, the arrangement comprising a diffractive optical device arranged in a housing with a light conduit to project and receive the light from a housing end of the diffractive optical element, the diffractive optical element arranged to guide and project light in use towards a rotating component through an aperture end of the diffractive optical device in use whereby light is reflected from the ends of the diffractive optical device and the rotating component to provide an indication of a gap between the aperture end of the diffractive optical device and the rotating component in use, wherein the housing presents the housing end of the diffractive optical device with a light emitter/receiver projecting light into the diffractive optical element at a displaced location for reduced exposure to high sustained temperatures; and wherein differences in reflected wavelength are utilized in order to determine clearance gap.

2. An arrangement as claimed in claim 1 wherein the housing incorporates an enclosure with the diffractive optical element at one end and the light emitter/receiver at the other end.

3. An arrangement as claimed in claim 1 wherein the light emitter/receiver is an optical fibre.

4. An arrangement as claimed in claim 1 wherein there is a lens between the light emitter/receiver and the diffractive optical element in order to guide projected light to and from the housing end.

5. An arrangement as claimed in claim 1 wherein the diffractive optical element includes a reflective surface for guiding the projected and/or reflective light.

6. An arrangement as claimed in claim 1 wherein the aperture end is sealed in order to limit exposure to contamination.

7. A machine incorporating a gap monitor arrangement as claimed in claim 1.

8. A machine as claimed in claim 7 wherein the machine comprises a gas turbine engine.

* * * * *